United States Patent
Meserole et al.

(10) Patent No.: US 6,803,025 B2
(45) Date of Patent: Oct. 12, 2004

(54) PROCESS FOR REMOVING $SO_3/H_2SO_4$ FROM FLUE GASES

(76) Inventors: Frank B. Meserole, 8719 Ridgehill Dr., Austin, TX (US) 78759; Robert E. Moser, 102 Ponderosa Dr., Santa Cruz, CA (US) 95060; James H. Wilhelm, 2394 Charros Rd., Sandy, UT (US) 84092

( * ) Notice: Subject to any disclaimer, the term of this patent is extended or adjusted under 35 U.S.C. 154(b) by 160 days.

(21) Appl. No.: 10/065,971

(22) Filed: Dec. 5, 2002

(65) Prior Publication Data

US 2004/0109802 A1 Jun. 10, 2004

(51) Int. Cl.⁷ .............................................. C01B 17/20

(52) U.S. Cl. .............................. 423/243.08; 423/243.06

(58) Field of Search ........................ 423/243.02, 243.06, 423/243.08, 244.07, 244.08

(56) References Cited

U.S. PATENT DOCUMENTS 5,342,593 A * 8/1994 Christiansen et al. .... 423/242.6
6,126,910 A * 10/2000 Wilhelm et al. ............ 423/210

* cited by examiner

Primary Examiner—Stanley S. Silverman
Assistant Examiner—Edward M. Johnson
(74) Attorney, Agent, or Firm—Gary M. Hartman; Domenica N. S. Hartman; Hartman & Hartman

(57) ABSTRACT

A process of using sodium carbonate and sodium bicarbonate solutions to remove $SO_3$ and other acidic gases or vapors from a flue gas without substantially decreasing the amount of sulfur dioxide also present in the flue gas. Very limited quantities of such solutions are injected into the flue gas in a manner that achieves a controlled droplet size, such that the solution dries on contact with the flue gas and the resulting dry particles of sodium carbonate/bicarbonate are sufficiently small as to have adequate surface area for reacting with $SO_3$, as well as any $H_2SO_4$ and, to some extent, HCl vapors in the flue gas.

20 Claims, 2 Drawing Sheets

PROCESS FOR REMOVING $SO_3/H_2SO_4$ FROM FLUE GASES

BACKGROUND OF INVENTION

1. Field of the Invention

The present invention generally relates to processes for removing acidic gases from flue gases, such as the exhaust gases produced by coal and oil-fired utility and industrial plants.

2. Description of the Related Art

Gas-liquid contactors and absorbers, or scrubbers, are widely employed to remove sulfur dioxide ($SO_2$) and acidic gases such as sulfur trioxide ($SO_3$), sulfuric, acid ($H_2SO_4$) vapors, hydrochloric acid (HCl) vapors, and hydrofluoric acid (HF) from flue gases produced by utility and industrial plants. Scrubbers generally have a quench zone where a liquid media is brought into intimate contact with a flue gas to remove acidic gases by absorption. The process by which acidic gases are removed from flue gases in this manner is generally referred to as wet flue gas desulfurization (wet FGD).

Sulfur dioxide is typically present in flue gases produced by coal and oilboilers at much higher concentrations than HCl, HF and $SO_3$. Removal of $SO_3$ and sulfuric acid vapors from such flue gases helps to reduce a visible plume produced as a result of the formation of a sulfuric acid mist in the quench zone of an FGD systems. The particle size of such a mist is generally in the submicron range, which is sufficiently small to enable the mist to penetrate most FGD scrubbers. Sulfuric acid emissions of as little as about 5 ppmv will usually result in a visible plume. Therefore, it is desirable to remove $SO_3$ from flue gases upstream of the FGD system. During the combustion of coal, most chlorides present in the coal are converted to HCl. The HCl in flue gases is removed very efficiently by $SO_2$ removal systems, and as a consequence can become highly concentrated in the scrubbing solutions. High concentrations of chlorides can interfere with the scrubber efficiency and lead to disposal problems. Therefore, the removal of HCl prior to the FGD system can also be beneficial in certain cases.

As a solution to the above, U.S. Pat. No. 6,126,910 to Wilhelm et al., incorporated herein by reference, teaches the use of soluble sulfite/bisulfite solutions, such as sodium sulfite ($Na_2SO_3$), sodium bisulfite ($NaHSO_3$), potassium sulfite ($K_2SO_2SO_3$$2HOH$), potassium bisulfite ($KHSO_3$) and mixtures thereof to remove $SO_3$ and other acidic gases from a flue gas without removing or decreasing the amount of sulfur dioxide also present in the flue gas. The process entails injecting (e.g., spraying) a concentrated solution containing a sulfite/bisulfite into the flue gas stream to react acidic gases (e.g., HCl, HF and/or $SO_3$) and form a reaction product, without reacting the sulfur dioxide. After removal of the acidic gas(es), sulfur dioxide can be removed from the flue gas farther downstream using conventional scrubbing techniques, which can be rendered more technically and/or economically desirable as a result of the absence of $SO_3$. According to Wilhelm et al., a soluble bisulfite salt such as sodium bisulfite selectively removes acidic gases such as HCl, HF and $SO_3$, but will not remove sulfur dioxide. Wilhelm et al. teach that, contrary to the object of the Wilhelm et al. process, reagents such as sodium carbonate ($Na_2CO_3$) and lime (CaO) remove sulfur dioxide.

SUMMARY OF INVENTION

The present invention is a process that enables the use of sodium carbonate ($Na_2CO_3$) and sodium bicarbonate ($Na_2HCO_3$) solutions to remove $SO_3$ and other acidic gases or vapors from a flue gas without removing or decreasing the amount of sulfur dioxide also present in the flue gas. While sodium carbonate solutions have previously been used to remove $SO_2$ in flue gas desulfurization (FGD) scrubbers, the present invention uses much smaller quantities of solution injected into the flue gas so that $SO_3$ removal is accomplished without substantial amounts of $SO_2$ being removed. For instance, the amount of sodium carbonate/sodium bicarbonate needed is believed to be less than about 10 to 15%, on a molar basis, of the amount of $SO_2/H_2SO_4$ present in the flue gas.

An important distinction of this invention is the use of a solution of sodium carbonate/bicarbonate instead of a solid sodium carbonate or sodium bicarbonate material. By introducing the solution as a spray, and by appropriately selecting the spray droplet size and solution concentration, the spray dries on contact with the flue gas and the resulting dry particles of sodium carbonate/bicarbonate are sufficiently small as to provide sufficient surface area to react with $SO_3$ and any $H_2SO_4$ and HCl vapors in the flue gas at low concentrations.

Other soluble species believed to be capable of similar use are aqueous solutions of sodium hydroxide (NaOH) and combinations of sodium hydroxide and sodium carbonate solutions. These materials may also be used in combination with the bisulfite solutions taught by Wilhelm et al., particularly solutions of sodium sulfite, sodium bisulfite, potassium sulfite, and/or potassium bisulfite. Solutions of other alkaline salts similar to these species, such as ammonium hydroxide ($NH_4OH$), potassium hydroxide (KOH), potassium carbonate ($K_2CO_3$) and potassium bicarbonate ($KHCO_3$), alone or in combination, may also be used in this process for $SO_3/H_2SO_4$ removal. Specifically, it is believed that a solution containing sodium hydroxide, ammonium hydroxide, potassium hydroxide, potassium carbonate, and/or potassium bicarbonate, with optional additions of sodium sulfite, sodium bisulfite, potassium sulfite, and/or potassium bisulfite, are also capable of being introduced as a spray whose droplet size and solution concentration enable the solution to dry on contact with the flue gas, at which point they become effective to react with $SO_3,H_2SO_4$ vapors and HCl vapors in the flue gas without removing sulfur dioxide.

The invention finds particular application in coal and oil-fired power plants, and can be used to reduce $SO_3$, vaporous $H_2SO_4$ and, to some extent, HCl from flue gases, thereby reducing corrosion and plume opacity problems. If the addition of sodium carbonate and/or sodium bicarbonate solution occurs upstream of the primary particulate control device (e.g., an ESP) of an FGD system, $SO_3$, vaporous $H_2SO_4$ and vaporous HCl can be removed along with fly ash while requiring minimal changes to the process. Another option is to add the sodium carbonate/bicarbonate solution upstream of the air preheater section of the FGD. Removal of $SO_3$ at this location will allow the system to be modified to reduce the preheater outlet temperature. Reduction of the gas temperature at this point can result in an increase in the overall boiler efficiency.

Other objects and advantages of this invention will be better appreciated from the following detailed description.

BRIEF DESCRIPTION OF DRAWINGS

The present invention will be described, by way of example, with reference to the accompanying drawings, in which FIGS. 1 and 2 schematically represent alternative embodiments of the invention.

DETAILED DESCRIPTION

This invention is a process for using particular reagents to remove acidic gases such as $SO_3$, $H_2SO_4$ vapors, and HCl vapors from a flue gas upstream of a conventional FGD scrubber. The invention employs aqueous solutions of the reagent in limited concentrations to reduce $SO_3$ content in the flue gas without reducing the level of sulfur dioxide in the flue gas. Preferred reagents are sodium carbonate and sodium bicarbonate. Other suitable reagents are believed to be sodium hydroxide, ammonium hydroxide, potassium hydroxide, potassium carbonate, and potassium bicarbonate. Any of these reagents can be used alone or in combination, with optional additions of sodium sulfite, sodium bisulfite, potassium sulfite, and/or potassium bisulfite.

Figure 1:
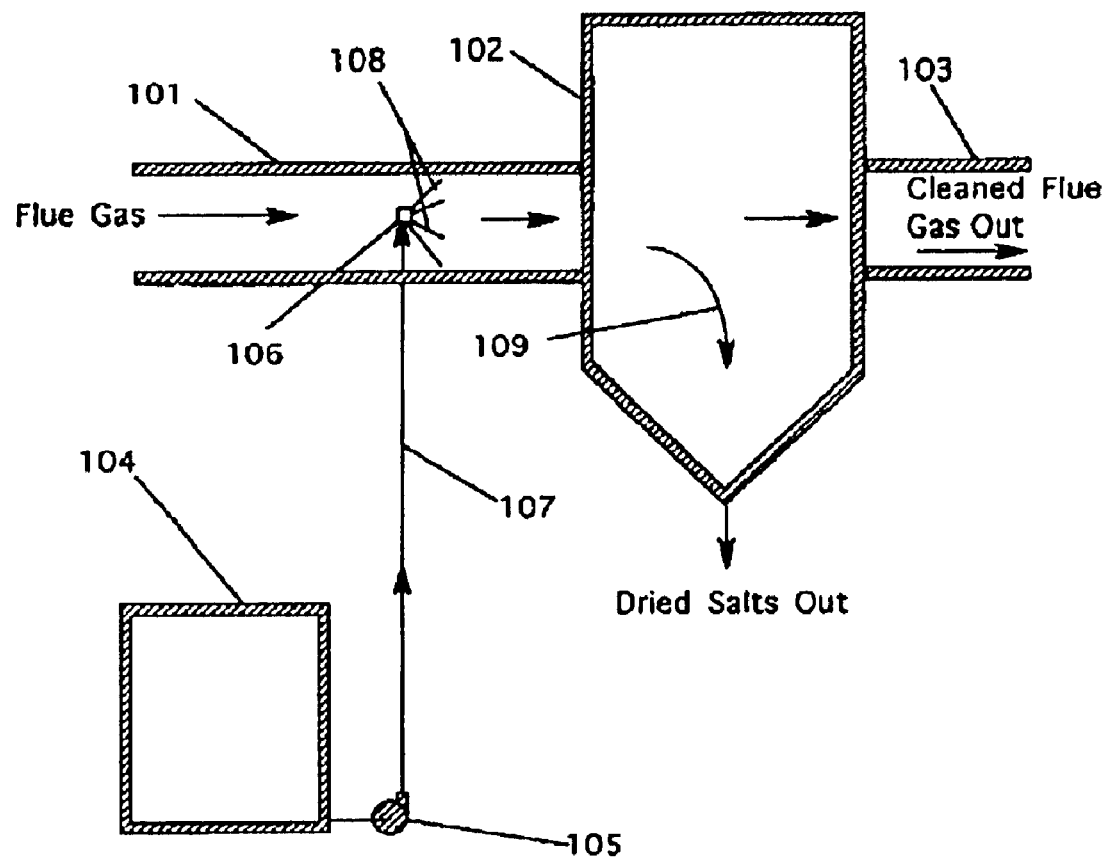

With reference to FIG. 1, a flue gas containing sulfur dioxide and acidic gases flows through a duct 101 toward a particulate control device (not shown), for example, an ESP, fabric filter, or wet scrubber. An aqueous solution containing one or more dissolved reagents of this invention is held in a container 10. The solution contains the reagent(s) in an amount to achieve a reagent concentration of less than 15 molar percent, preferably less than 10 molar percent, of the amount of sulfur dioxide in the flue gas. The solution is delivered via a pump 105 through a pipe 107 to the duct 101, where the solution is introduced as a spray with a spray nozzle 106. The nozzle 106 dispenses the aqueous solution to have a maximum droplet size of preferably not greater than about 50 to 100 micrometers, such that the water component of the solution evaporates rapidly after being injected, forming small solid particles from the dissolved reagent. The solid particles of reagent react with $SO_3$/$H_2SO_4$, and to some extent HCl vapors, to effectively remove these acidic gases from the flue gas. As an example, if the reagent is sodium carbonate and/or sodium bicarbonate, the resulting reaction products are sodium sulfate and sodium chloride in proportion to the relative amounts of each species sorbed. The flue gas and entrained reaction products are shown as then being delivered to a bag house 102, where the dried salts 109 are collected and removed. From the bag house 102, the flue gas continues through a second duct 103 to the downstream particulate control device, where $SO_2$ is removed.

In view of the above, the present invention provides a process similar in some respects to U.S. Pat. No. 6,126,910 to Wilhelm et al., which describes the use of bisulfite solutions to remove $SO_3$ and HCl. However, unlike the sulfite/bisulfite solutions taught by Wilhelm et al., the sodium carbonate/bicarbonate solutions, as well as the other alkaline solutions proposed by this invention, are also known to remove $SO_2$. According to the present invention, the fine droplet size and low solution concentration enable the aqueous solution to remove the selected acidic gases without decreasing the amount of sulfur dioxide in the flue gas. More particularly, substantially all of the $SO_2$ reacted by the solution is eventually reformed, such that the $SO_2$ content in the flue gases is not substantially reduced. For example, $SO_2$ will react with sodium carbonate and sodium bicarbonate to form sodium sulfite ($Na_2SO_3$) and sodium bisulfite ($NaHSO_3$), which in turn reacts with additional $SO_3$ and any HCl to reform $SO_2$ and form additional amounts of sodium chloride (NaCl) and sodium sulfate ($Na_2SO_4$). The overall reactions involving sodium carbonate and sodium bicarbonate with $SO_3$ and HCl are shown below:

$$2NaHCO_3 + SO_3 \rightarrow Na_2SO_4 + H_2O + 2CO_2 \quad (1)$$

$$Na_2CO_3 + SO_3 \rightarrow Na_2SO_4 + CO_2 \quad (2)$$

$$NaHCO_3 + HCl \rightarrow NaCl + H_2O + CO_2 \quad (3)$$

$$Na_2CO_3 + 2HCl \rightarrow 2NaCl + CO_2 + H_2O \quad (4)$$

The following reactions involving sodium carbonate and sodium bicarbonate with $SO_2$ may also occur:

$$2NaHCO_3 + SO_2 \rightarrow Na_2SO_3 + H_2O + 2CO_2 \quad (5)$$

$$Na_2CO_3 + SO_2 \rightarrow Na_2SO_3 + CO_2 \quad (6)$$

The $SO_2$ removed by reacts (5) and (6) is substantially reformed as follows:

$$Na_2SO_3 + SO_3 \rightarrow Na_2SO_4 + SO_2 \quad (7)$$

$$Na_2SO_3 + 2HCl \rightarrow 2NaCl + H_2O + SO_2 \quad (8)$$

As previously noted, sodium hydroxide is another soluble species that can be similarly used in an aqueous solution alone or in combination with sodium carbonate to remove $SO_3$ and HCl. These reactions are shown below:

$$2NaOH + SO_3 \rightarrow Na_2SO_4 + H_2O \quad (9)$$

$$NaOH + HCl \rightarrow NaCl + H_2O \quad (10).$$

Figure 2:
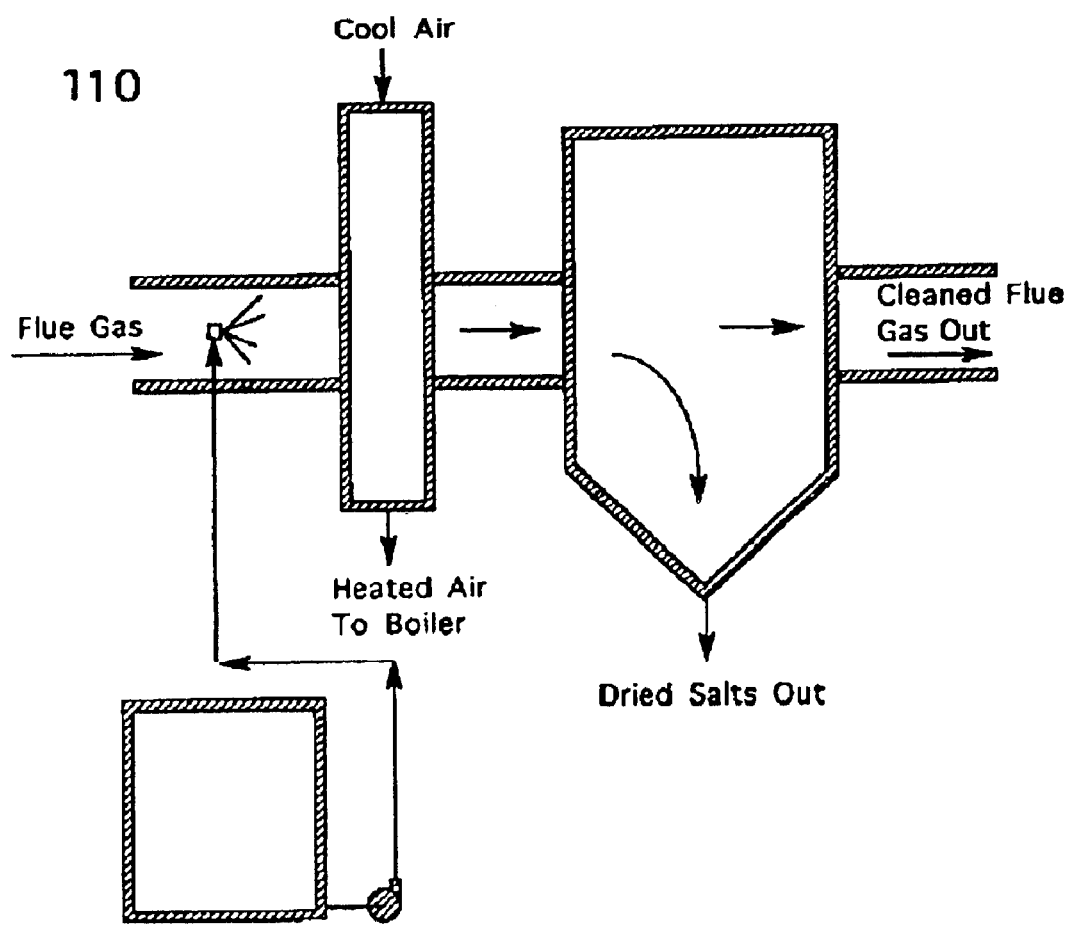

The injection of solutions in accordance with this invention upstream of an air preheater section of a coal-fired boiler system, and the associated removal of $SO_3$ provides the ability to reduce the outlet temperature without inducing corrosion conditions. Such an embodiment is illustrated in FIG. 2, which represents essentially the same FGD system as shown in FIG. 1 except that the solution is injected immediately upstream of an air preheater 110. The preheater 110 increases the recovery of heat from the hot flue gases, such that boiler efficiency is improved resulting in improved economics. Removing acidic gases upstream of the preheater 110 avoids the formation of a sulfuric acid mist within the preheater 110 as the flue gases are cooled. Additional benefits provided by the present invention include the potential improvement of fly ash removal across ESP's due to improved ash resistivity in the presence of additional sodium.

A full-scale test of the invention was performed at a 250 MW power plant. One half of the gas from the plant's economizer was treated with a spray solution containing about 0.675 moles of sodium carbonate per liter and injected into the flue gas stream at rates ranging from 0 to about 10 gpm (0 to about 38 liters/minute). The droplet size of the solution ranged from a mean of about 10 to 30 micrometers, with a maximum size of less than about 50–100 micrometers. Acid dew point measurements were made at the air heater inlet and at the electrostatic precipitator outlet to provide a measurement of the concentration of sulfuric acid ($SO_3$) in the flue gas. Without injection of the sodium carbonate solution, the acid dewpoint correlated to an $SO_3$ concentration in the flue gas of approximately 30 ppm. Optimum performance was achieved with 5.5 gpm (about 20.8 liters/minute) of the sodium carbonate solution, which yielded an $SO_3$ concentration in the flue gas at the precipitator outlet of less than about 2 ppm $SO_3$ (corresponding to removal of about 93.3% of the $SO_3$ from the flue gas). The measurements before the air heater, which gave a much shorter reaction time, were less favorable, but still provided removal of about 10 to about 40% of the $SO_3$ in the flue gas. The quantity of reagent injected was calculated to be sufficient to remove a maximum of about 2% of the sulfur dioxide in the flue gas. However, there was no significant change in the sulfur dioxide concentration measured by continuous sulfur dioxide monitors in place, evidencing that the net effect of the reagent addition was the removal of $SO_3$ without removing any significant amounts of sulfur dioxide.

While the invention has been described in terms of specific embodiments, it is apparent that other forms could be adopted by one skilled in the art. Accordingly, it should be understood that the invention is not limited to the specific embodiments described and illustrated in the Figure. It should also be understood that the phraseology and terminology employed above are for the purpose of disclosing the embodiments, and do not necessarily serve as limitations to the scope of the invention. Instead, the scope of the invention is to be limited only by the following claims.

What is claimed is:

1. A process of removing acidic gases from a flue gas that contains sulfur dioxide without substantially decreasing the amount of sulfur dioxide in the flue gas, the process comprising the steps of:

preparing an aqueous solution containing at least one reaction compound selected from the group consisting of sodium carbonate, sodium bicarbonate, sodium hydroxide, ammonium hydroxide, potassium hydroxide, potassium carbonate, and potassium bicarbonate; and contacting a flue gas with the aqueous solution in the form of a spray whose droplet size and solution concentration enable the aqueous solution to dry on contact with the flue gas and then react with an acidic gas in the flue gas to remove the acidic gas without decreasing the amount of sulfur dioxide in the flue gas.

2. A process according to claim 1, wherein the acidic gas is at least one of sulfur trioxide, sulfuric acid vapors and hydrochloric acid vapors.

3. A process according to claim 1, wherein the aqueous solution further contains at least one of sodium sulfite, sodium bisulfite, potassium sulfite and potassium bisulfite.

4. A process according to claim 1, wherein the droplet size of the aqueous solution when contacting the flue gas is not larger than about 100 micrometers.

5. A process according to claim 1, wherein the reaction compound is present in the aqueous solution at a concentration of less than 15 molar percent of the amount of sulfur dioxide in the flue gas.

6. A process according to claim 1, wherein the reaction compound is present in the aqueous solution at a concentration of less than 10 molar percent of the amount of sulfur dioxide in the flue gas.

7. A process according to claim 1, wherein the reaction compound consists of sodium carbonate and sodium bicarbonate, and optionally one or more of sodium hydroxide, ammonium hydroxide, potassium hydroxide, potassium carbonate, potassium bicarbonate, potassium sulfite, potassium bisulfite, sodium sulfite and sodium bisulfite.

8. A process according to claim 1, wherein the reaction compound consists of sodium carbonate and sodium bicarbonate.

9. A process according to claim 1, further comprising the step of flowing the flue gas through an air preheater immediately downstream from where the flue gas is contacted with the aqueous solution.

10. A process of removing acidic gases from a flue gas that contains sulfur dioxide without substantially decreasing the amount of sulfur dioxide in the flue gas, the process comprising the steps of:

preparing an aqueous solution containing at least one reaction compound selected from the group consisting of sodium carbonate, sodium bicarbonate, sodium hydroxide, ammonium hydroxide, potassium hydroxide, potassium carbonate, and potassium bicarbonate, the reaction compound being present in the aqueous solution at a concentration of less than 15 molar percent of the amount of sulfur dioxide in the flue gas;

contacting a flue gas with the aqueous solution in the form of a spray having a droplet size of not larger than about 100 micrometers so that the aqueous solution dries on contact with the flue gas to form particles of the reaction compound; and reacting the particles of the reaction compound with an acidic gas in the flue gas to remove the acidic gas, wherein any sulfur dioxide reacted by the reaction compound is substantially reformed so that the amount of sulfur dioxide in the flue gas is not substantially decreased.

11. A process according to claim 10, wherein the acidic gas is at least one of sulfur trioxide and sulfuric acid vapors.

12. A process according to claim 10, wherein the reaction compound consists of sodium carbonate and sodium bicarbonate, and optionally one or more of sodium hydroxide, ammonium hydroxide, potassium hydroxide, potassium carbonate, potassium bicarbonate, potassium sulfite, potassium bisulfite, sodium sulfite and sodium bisulfite.

13. A process according to claim 12, wherein the reaction compound is present in the aqueous solution at a concentration of less than 10 molar percent of the amount of sulfur dioxide in the flue gas.

14. A process according to claim 10, wherein the aqueous solution further contains at least one of sodium sulfite, sodium bisulfite, potassium sulfite and potassium bisulfite.

15. A process according to claim 14, wherein the reaction compound is present in the aqueous solution at a concentration of less than 10 molar percent of the amount of sulfur dioxide in the flue gas.

16. A process according to claim 10, wherein the reaction compound consists of sodium carbonate and sodium bicarbonate, and is present in the aqueous solution at a concentration of less than 10 molar percent of the amount of sulfur dioxide in the flue gas.

17. A process according to claim 10, wherein the reaction compound consists of one or more of sodium hydroxide, ammonium hydroxide, potassium hydroxide, potassium carbonate, and potassium bicarbonate.

18. A process according to claim 17, wherein the reaction compound is present in the aqueous solution at a concentration of less than 10 molar percent of the amount of sulfur dioxide in the flue gas.

19. A process according to claim 10, wherein the reaction compound is present in the aqueous solution at a concentration of less than 10 molar percent of the amount of sulfur dioxide in the flue gas.

20. A process according to claim 10, further comprising the step of flowing the flue gas through an air preheater immediately downstream from where the flue gas is contacted with the aqueous solution.

* * * * *